US012292300B2

(12) United States Patent
Sen et al.

(10) Patent No.: US 12,292,300 B2
(45) Date of Patent: *May 6, 2025

(54) SYSTEMS AND METHODS FOR DYNAMIC TRANSPARENCY ADJUSTMENTS FOR A MAP OVERLAY

(71) Applicant: Adeia Guides Inc., San Jose, CA (US)

(72) Inventors: Susanto Sen, Karnataka (IN); Shakir Sharfraz Ashfaq Ahamed, Karnataka (IN); Sriram Ponnusamy, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/142,836

(22) Filed: May 3, 2023

(65) Prior Publication Data
US 2023/0273042 A1    Aug. 31, 2023

Related U.S. Application Data

(63) Continuation of application No. 16/447,592, filed on Jun. 20, 2019, now Pat. No. 11,674,818.

(51) Int. Cl.
*G01C 21/36* (2006.01)
*G01C 21/34* (2006.01)

(52) U.S. Cl.
CPC ....... *G01C 21/367* (2013.01); *G01C 21/3415* (2013.01); *G01C 21/3492* (2013.01)

(58) Field of Classification Search
CPC .............. G01C 21/367; G01C 21/3415; G01C 21/3492; G01C 21/3626
See application file for complete search history.

(56) References Cited

U.S. PATENT DOCUMENTS

| 11,120,593 | B2 | 9/2021 | Sen et al. |
| 11,674,818 | B2 | 6/2023 | Sen et al. |
| 12,073,498 | B2 | 8/2024 | Sen et al. |
| 2002/0140635 | A1 | 10/2002 | Saitou et al. |
| 2002/0154168 | A1 | 10/2002 | Ijäs et al. |
| 2011/0025531 | A1 | 2/2011 | Geelen et al. |
| 2011/0153198 | A1 | 6/2011 | Kokkas et al. |
| 2011/0208417 | A1 | 8/2011 | Fink et al. |

(Continued)

FOREIGN PATENT DOCUMENTS

JP    2015215619 A    12/2015

OTHER PUBLICATIONS

"ISR & Written Opinion", International Search Report and Written Opinion of PCT/US2020/038410 dated Nov. 2, 2020 (21 pages), Nov. 2, 2020.

*Primary Examiner* — Erin M Piateski
*Assistant Examiner* — Gabriel Joseph Rene Lambert
(74) *Attorney, Agent, or Firm* — Haley Guiliano LLP

(57) ABSTRACT

Systems and methods are described herein for adjusting a transparency of a map overlay. A mapping application generates for display the map overlay at a first level of transparency depicting at least a portion of a route. The mapping application receives an indication of a current location on the route and based on the current location, detects an upcoming directional change on the route. In response to detecting the upcoming directional change, the mapping application adjusts the transparency of the map overlay to a second level of transparency.

20 Claims, 13 Drawing Sheets
(2 of 13 Drawing Sheet(s) Filed in Color)

(56) References Cited

U.S. PATENT DOCUMENTS

| | | | |
|---|---|---|---|
| 2012/0185165 A1 | 7/2012 | Geelen et al. | |
| 2012/0262482 A1 | 10/2012 | Miwa | |
| 2013/0211708 A1* | 8/2013 | Takahashi | G01C 21/3896 |
| | | | 701/411 |
| 2013/0314441 A1 | 11/2013 | Grasset et al. | |
| 2013/0325321 A1 | 12/2013 | Pylappan | |
| 2013/0345980 A1 | 12/2013 | Van Os et al. | |
| 2014/0095303 A1 | 4/2014 | Jones et al. | |
| 2014/0240348 A1 | 8/2014 | Arita et al. | |
| 2014/0313229 A1 | 10/2014 | Arita et al. | |
| 2014/0359656 A1 | 12/2014 | Banica et al. | |
| 2015/0153182 A1 | 6/2015 | Tu et al. | |
| 2015/0160841 A1 | 6/2015 | Chang | |
| 2015/0161762 A1 | 6/2015 | Fujiwara | |
| 2015/0232030 A1 | 8/2015 | Bongwald | |
| 2016/0003636 A1* | 1/2016 | Ng-Thow-Hing | G01C 21/365 |
| | | | 701/418 |
| 2016/0011854 A1 | 1/2016 | Furumoto et al. | |
| 2016/0102992 A1 | 4/2016 | Otero Diaz et al. | |
| 2017/0061696 A1 | 3/2017 | Li et al. | |
| 2017/0148222 A1 | 5/2017 | Holzer et al. | |
| 2018/0058877 A1 | 3/2018 | Andrew et al. | |
| 2018/0088323 A1 | 3/2018 | Bao et al. | |
| 2018/0093663 A1 | 4/2018 | Kim et al. | |
| 2018/0284808 A1* | 10/2018 | Minagawa | G05D 1/0044 |
| 2018/0330515 A1 | 11/2018 | Stall et al. | |
| 2019/0003851 A1 | 1/2019 | Ishikawa et al. | |
| 2019/0041231 A1* | 2/2019 | Kitada | G01C 21/3676 |
| 2019/0043259 A1 | 2/2019 | Wang et al. | |
| 2019/0156573 A1 | 5/2019 | Palos et al. | |
| 2019/0340837 A1 | 11/2019 | Shmayahu et al. | |
| 2020/0090401 A1 | 3/2020 | Terrano | |
| 2020/0125244 A1 | 4/2020 | Feinstein | |
| 2020/0400456 A1* | 12/2020 | Sen | G01C 21/3415 |
| 2021/0375018 A1 | 12/2021 | Sen et al. | |

* cited by examiner

300

| Map Elements | Initial Transparency Level | Directional Change Transparency Level |
|---|---|---|
| Terrain | 100% | 95% |
| Streets | 50% | 30% |
| Street Borders | 40% | 30% |
| Restaurants | 30% | 10% |
| Hotels | 30% | 10% |
| ... | ... | ... |
| ... | ... | ... |
| Path Indicator | 60% | 20% |

| Transparency Level | Pixel Selection Value | Contrast Adjustment Value |
|---|---|---|
| 0% | 0/100 | 40/100 |
| 25% | 25/100 | 30/100 |
| ... | ... | ... |
| 50% | 50/100 | 20/100 |
| 75% | 75/100 | 10/100 |
| ... | ... | ... |
| 100% | 100/100 | 0 |

FIG. 4

SYSTEMS AND METHODS FOR DYNAMIC TRANSPARENCY ADJUSTMENTS FOR A MAP OVERLAY

CROSS-REFERENCE TO RELATED APPLICATION

This application is a continuation of U.S. patent application Ser. No. 16/447,592, filed Jun. 20, 2019, which is hereby incorporated by reference herein in its entirety.

BACKGROUND

The present disclosure is directed to mapping applications, and more particularly to mapping applications that provide map overlays for simultaneous use with other applications.

SUMMARY

Mapping applications are a crucial component of modern navigation, providing users with the means for tracking, getting directions, and viewing different parts of the world. In some scenarios, users may access mapping applications simultaneously with other applications (e.g., such as when tracking the arrival of a taxi while watching a movie on a media streaming application). The integration between mapping applications and other applications leaves a lot to be desired, however, as simultaneously displaying a mapping application with another application often involves using split-screen views or invasive hovering windows. Mapping applications provide no way of intelligently adjusting a visual feature (e.g., the transparency) of a map overlay to minimize the amount of obstruction of the secondary content beneath the map overlay (e.g., by fading out the map overlay when nothing of significance is being displayed on the map).

Systems and methods are thus described herein for adjusting the transparency of a map overlay based on upcoming navigation information. In one embodiment, a mapping application generates a display of a map overlay at a first level of transparency over content being displayed on a device. The transparency of the map overlay is adjustable (e.g., from 100%, which indicates that the map overlay is completely faded out, to 0%, which indicates that the map overlay is fully opaque). For example, the first level of transparency may be 75%. The map overlay depicts a route to a destination. Depending on the length of the route, the mapping application may generate only a portion of the route at any given time. The mapping application subsequently receives an indication (e.g., global-positioning-system (GPS) coordinates) of a current location of a tracked device/vehicle moving along the route. Based on the indication, the mapping application detects an upcoming directional change on the route (e.g., an instruction to turn left at an intersection) and in response to the detection, adjusts the transparency of the map overlay to a second level of transparency (e.g., adjusting the transparency to 50% to increase the prominence of the map). In this scenario, the map overlay is made more prominent only when there is an upcoming directional change on the route. Accordingly, if the tracked device begins moving along a path for a period of time without any upcoming directional changes in the vicinity of the tracked device, the mapping application will adjust the transparency to a third level of transparency (e.g., a higher transparency that fades out the overlay because the map is not displaying anything of significance).

The transparency adjustments of the map overlay may also be dependent on the displayed content. For example, in some embodiments, the mapping application retrieves metadata of the displayed content. The metadata may identify an upcoming significant frame in the displayed content. A frame may be pre-classified by the content provider as "significant," implying that the user should have an unobstructed view of the frame. Alternatively, the mapping application may analyze, using image processing, the contents of an upcoming frame and determine whether the frame is significant to the user based on a stored user profile (e.g., a frame may depict a fight scene—the fight scene being associated with the genre "action," which the user prefers viewing according to his/her viewing history). In response to detecting that the significant frame is being displayed, the mapping application adjusts the transparency of the map overlay to a third level of transparency (e.g., 100%).

The mapping application may employ various processes to detect the upcoming directional change. For example, the route may comprise a series of sequential directions from an initial location to a destination. The mapping application may thus identify a plurality of directions in the route and the respective reference location where each direction in the plurality of directions is triggered (e.g., turning left at a particular location). The mapping application subsequently determines whether the current location of the tracked device/vehicle is within a threshold distance from a reference location of a direction in the plurality of directions. In response to determining that the current location is within the threshold distance from the reference location, the mapping application detects the upcoming directional change.

The mapping application may additionally detect the upcoming direction change based on identifying alternate routes. For example, the mapping application may estimate a remaining travel time for reaching a destination of the route. In order to expedite the travel to the destination, the mapping application identifies an alternate route that can be taken at a location on the route (i.e., a route that branches off from the current route) and that will take less time to navigate through to the destination. In response to determining that the current location is within a threshold distance from the location (e.g., the location from where the alternate route can be taken is nearby), the mapping application detects the upcoming directional change.

Identifying alternate routes, in some embodiments, is based on the amount of traffic on a route. For example, if there is a significant amount of traffic on a route, there may be an inclination to change directions and travel through an alternate route with less traffic. The mapping application accordingly identifies an alternate route that has a lower amount of traffic than the current route and that branches off the route at a particular location. In response to determining that the current location is within a threshold distance from the particular location, the mapping application detects the upcoming directional change.

In response to detecting an upcoming directional change, the mapping application adjusts the transparency of the map overlay to a second level of transparency. In some embodiments, the mapping application adjusts the transparency by modifying the colors in the map overlay based on the colors in the displayed content. Specifically, the mapping application identifies a portion of the displayed content that overlaps with a portion of the map overlay. The mapping application determines a first color of the overlapping portion of the displayed content and adjusts, in the identified portion of the map overlay, a second color of the map overlay. The adjustment of the second color is performed by the mapping application to modify contrast between the map overlay and the displayed content and establish the visual configurations of the second level of transparency. Specifically, the mapping application selects a plurality of pixels in the second portion of the map overlay (e.g., selects every third pixel in the map overlay) and sets the second color of the plurality of pixels to the first color.

The mapping application may also adjust the transparency of specific portions of the map overlay. In some embodiments, the mapping application identifies a location of interest in a user profile (e.g., a location that a user has previously visited or has manually marked). In response to determining that the map overlay is displaying the location of interest, the mapping application adjusts the transparency of a portion of the map overlay that depicts a location of interest.

The transparency adjustment of specific portions of the map overlay may also be content dependent. For example, the mapping application may analyze the portion of the frame of the displayed content over which the map overlay is being generated to determine if the portion depicts a pre-defined object (e.g., a face, a location, a score, etc.,) that should not be obstructed. In response to determining that the portion does depict a pre-defined object, the mapping application adjusts the transparency of the overlay portion that overlaps with the portion of the frame (e.g., selects a higher transparency to reduce obstruction).

In some embodiments, the mapping application determines whether the tracked device/vehicle has changed position. The mapping application determines a receipt time of the first indication received of the current location. The mapping application subsequently receives a second indication of an updated current location on the route. In response to determining that the current location is the same as the updated current location and that a threshold period of time has elapsed since the receipt time, the mapping application adjusts the transparency of the map overlay to a third level of transparency that is greater than the second level of transparency (e.g., because nothing of significance is being depicted on the map overlay).

It should be noted that the systems, methods, apparatuses, and/or aspects described above may be applied to, or used in accordance with, other systems, methods, apparatuses, and/ or aspects described in this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects and advantages of the disclosure will be apparent upon consideration of the following detailed description, taken in conjunction with the accompanying drawings, in which like reference characters refer to like parts throughout, and in which:

FIG. 3 shows an illustrative example of a visual configurations data structure that indicates the transparency levels for specific map elements of the map overlay, in accordance with some embodiments of the disclosure;

FIG. 4 shows an illustrative example of a visual configurations data structure that indicates pixel selection and contrast adjustment values for a given transparency level, in accordance with some embodiments of the disclosure;

DETAILED DESCRIPTION

Figure 1:
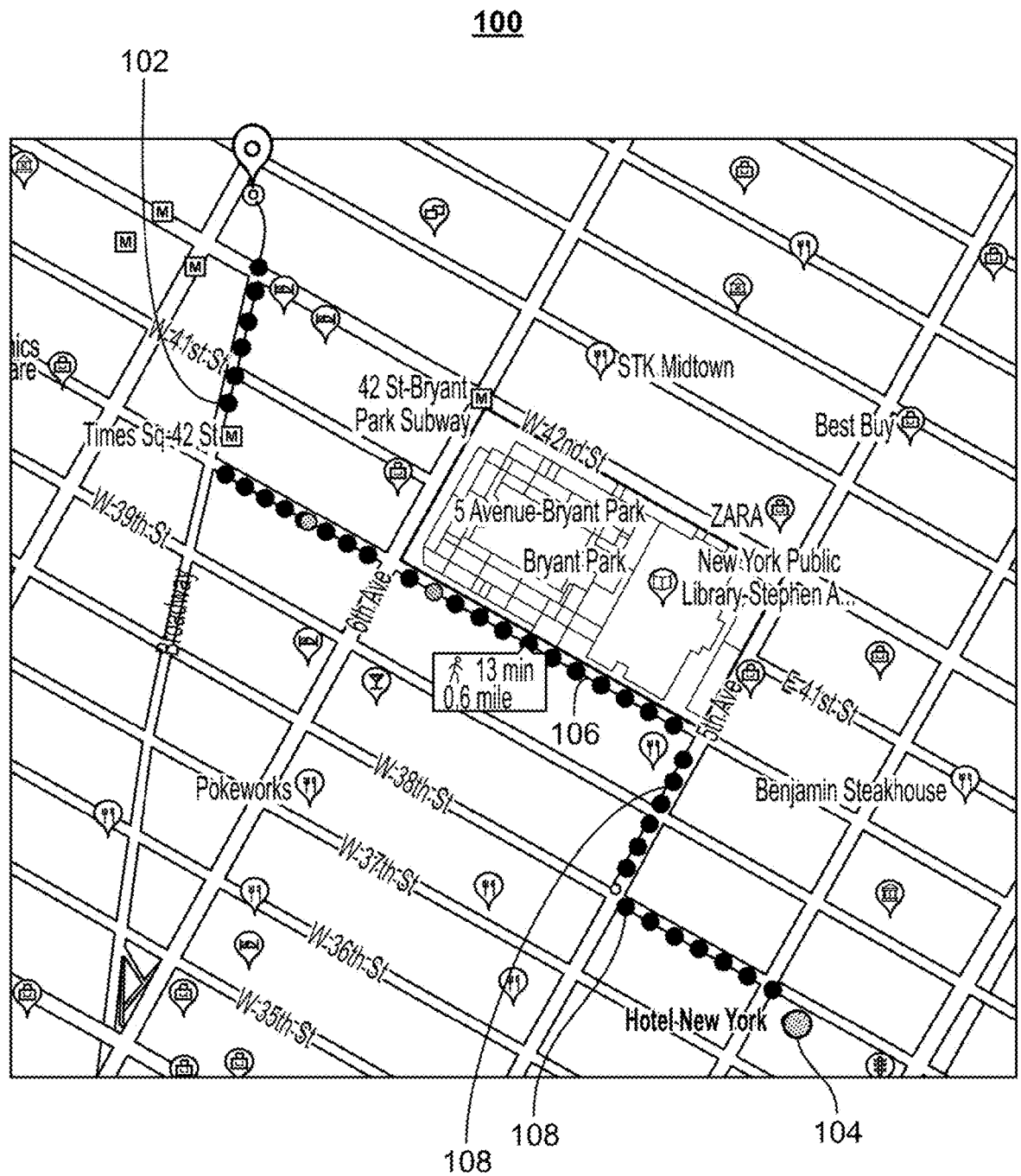
FIG. 1 shows an illustrative example of a map with information to display in an overlay, in accordance with some embodiments of the disclosure.

FIG. 1 shows illustrative example 100 of a map with information to display in an overlay, in accordance with some embodiments of the disclosure. Mapping applications are used for various reasons, including tracking a user's position, getting directions and viewing streets and landmarks. Due to the abundance of services such as food delivery, online shopping, car service, etc., users are interested in tracking devices and vehicles other than their own. For example, a user may order food using a food delivery service such as Uber Eats™. Certain food delivery services provide real-time tracking of deliveries by displaying the position of the driver's vehicle as he/she is making the delivery. In example 100, suppose that the route (e.g., route 102) of a vehicle is being tracked from an initial location (e.g., Walgreens™) to destination 104 (e.g., a hotel). In the vicinity of the respective locations are various indicators of landmarks. Location 106 represents a current location of the vehicle on route 102. As depicted in example 100, route 102 consists of three turns (i.e., directional changes). The first directional change is a left turn at the intersection of W. $40^{th}$ Street and Broadway. The second and third directional changes are each labelled as directional change 108. These are upcoming changes in direction (one being a right turn occurring at the intersection of W. $40^{th}$ Street and $5^{th}$ Avenue and the other being a left turn occurring at the intersection of W. 38$^{th}$ Street and 5$^{th}$ Avenue).

Figure 2:
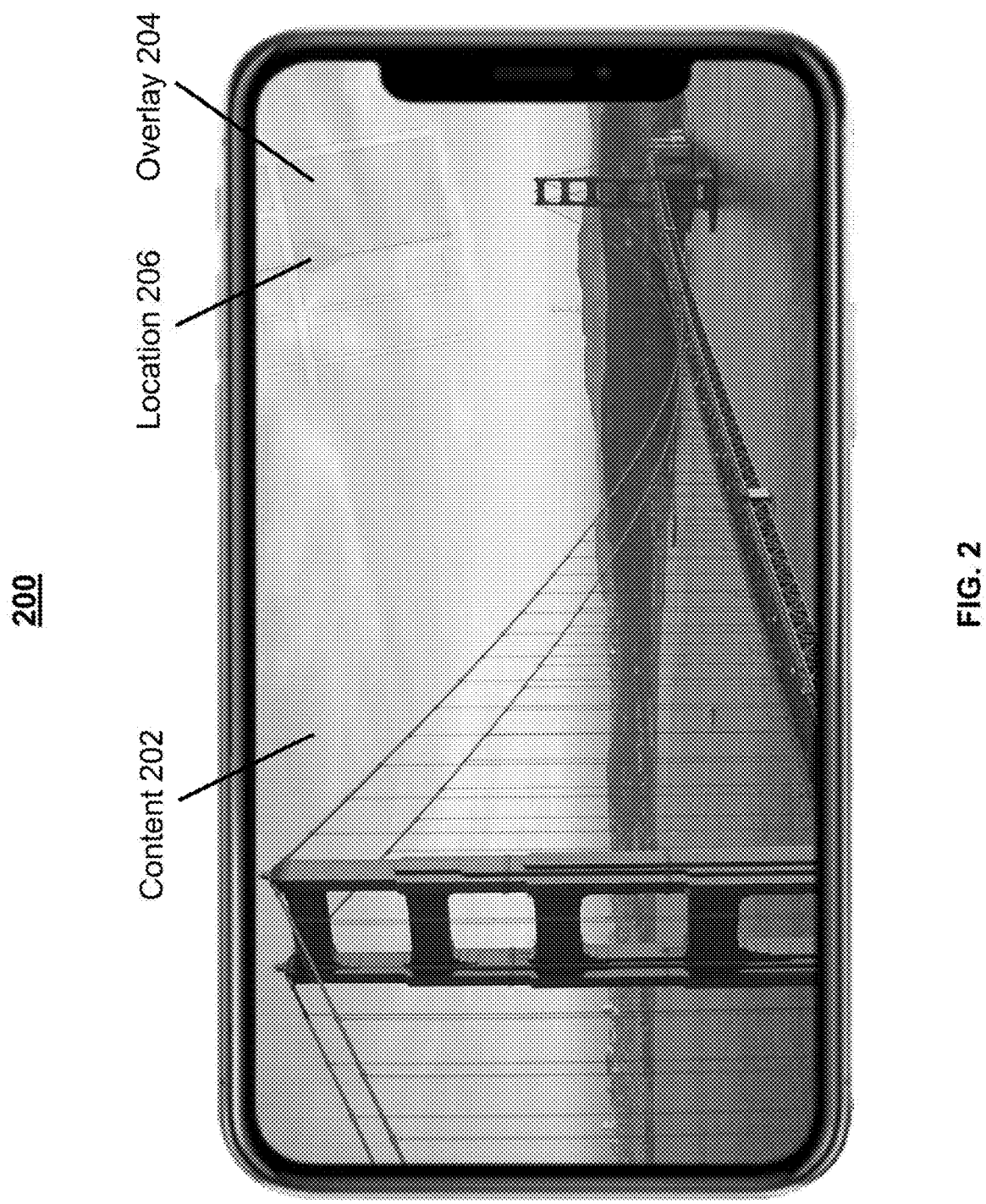
FIG. 2 shows an illustrative example of a map overlay generated over displayed content at a first transparency level when no upcoming directional change is detected, in accordance with some embodiments of the disclosure.

FIG. 2 shows illustrative example 200 of a map overlay generated over displayed content at a first transparency level when no upcoming directional change is detected, in accordance with some embodiments of the disclosure. The mapping application generates for display at least a portion of route 102 of example 100 in overlay 204. For example, the mapping application may generate map elements (e.g., streets, landmarks, terrain, etc.) that are within a threshold distance from location 206, which is a position on route 102. Furthermore, the map overlay may be generated over any secondary application (e.g., the Netflix™ application) or any user interface (e.g., the home screen or a menu screen of a device, such as a smartphone, where applications can be accessed). Example 200 depicts overlay 204 generated over content 202 (e.g., a video such as a documentary about the Golden Gate Bridge). In order to reduce the amount of obstruction of the secondary application/user interface (e.g., content 202) caused by overlay 204, the mapping application increases the transparency of the map overlay by selecting visual configurations listed in a visual configurations data structure.

When generating overlay 204 over content 202, the mapping application identifies an appropriate overlay area in content 202 to minimize the amount of obstruction caused by overlay 204. An overlay area is a portion of a frame of the displayed content where an overlay can be generated. This portion ideally features no important content. Depending on the displayed content, important content may be faces, locations, game scores, logos, subtitles, etc. In some embodiments, the mapping application retrieves metadata of the content 202, which indicates a plurality of overlay areas where an overlay can be generated. The mapping application identifies, from the plurality of overlay areas, a candidate overlay area and determines whether a size of the candidate overlay area is greater than respective sizes of overlay areas in the plurality of overlay areas. In response to determining that the size of the candidate overlay area is greater than the respective sizes of the overlay areas in the plurality of overlay areas, the mapping application selects the candidate overlay area as the overlay area on which to generate the virtual map. In example 200, the overlay area is in the upper right corner of the frame of content 202 (displaying the sky). The overlay area may specifically be bounded by a plurality of bordering pixels (e.g., a rectangle with a height of 500 pixels and a width of 400 pixels). The mapping application may thus generate overlay 204 such that it does not exceed those bounds.

FIG. 3 shows illustrative example 300 of a visual configurations data structure that indicates the transparency levels for specific map elements of the map overlay, in accordance with some embodiments of the disclosure. In example 300, the data structure is a two-dimensional array that features three columns: Map Elements, Initial Transparency Level, and Directional Change Transparency Level. The Map Elements column includes a plurality of elements that can be displayed on a map (e.g., terrain, streets, street borders, restaurants, etc.). For each map element, the Initial Transparency Level provides a value of the opacity of the map element relative to a maximum transparency (e.g., not visible) and a minimum transparency (e.g., fully opaque). Although the level is shown to be quantitative, the level may also be qualitative (e.g., where 100% corresponds to the string "not visible" and 0% corresponds to the string "fully opaque"). The mapping application uses the Initial Transparency Level when generating overlay 204. For example, according to the visual configurations array, the base floor is to be 100% transparent whereas streets are to be 50% transparent. As seen in example 300, the ground between the streets is completely see-through (e.g., content 202 is unobstructed in those areas), whereas the streets are more prominent than the floor.

Simultaneous to displaying overlay 204, the mapping application receives indications of a current location (e.g., location 206 of FIG. 2 and location 506 of FIG. 5) of the tracked vehicle/device. Based on a received indication of a current location, the mapping application determines whether there is an upcoming directional change. The mapping application may, for example, identify a plurality of directions in the route. Referring to example 100, route 102 may feature the following directions:

1. Travel along Broadway from Walgreens to W. 40$^{th}$ Street
2. Turn left at the intersection of Broadway and W. 40$^{th}$ Street
3. Travel along W. 40$^{th}$ Street to 5$^{th}$ Avenue
4. Turn right at the intersection of W. 40$^{th}$ Street and 5$^{th}$ Avenue
5. Travel along 5$^{th}$ Avenue to W. 38$^{th}$ Street
6. Turn left at the intersection of 5$^{th}$ Avenue and W. 38$^{th}$ Street
7. Travel along W. 38$^{th}$ Street to Hotel New York These seven directions are only exemplary, and the route may contain additional details or steps in other embodiments. Each direction is associated with a respective reference location where the direction is triggered. For example, direction 1 (travel along) is triggered at the reference location Walgreens, and direction 2 (turn left) is triggered at the intersection of Broadway and W. 40$^{th}$ Street. Location 106 is the current location of the tracked vehicle on route 102 and is equivalent to location 206 in overlay 204. The mapping application determines that location 206 is on W. 40$^{th}$ Street between 6$^{th}$ Avenue and 5$^{th}$ Avenue and accordingly detects that the tracked vehicle is following direction 3. The next upcoming directional change would be direction 4, where the tracked vehicle is expected to turn right at the reference location of direction 4 (i.e., the intersection of W. 40$^{th}$ Street and 5$^{th}$ Avenue). The mapping application determines whether the current location of the tracked vehicle is within a threshold distance (e.g., 5 meters) from the reference location of a direction (e.g., direction 4) in the plurality of directions. In response to determining that the current location is within the threshold distance from the reference location, the mapping application detects the upcoming directional change and adjusts the transparency of overlay 204 to make it more prominent.

Adjusting the transparency of overlay 204 may involve adjusting the transparency of individual components. For example, in example 300, the Directional Change Transparency Level column indicates the transparency of each map element when a directional change is detected. The mapping application, which initially set the transparency level of streets to 50%, retrieves the directional change transparency level from the visual configurations database for streets (e.g., 30%) and adjusts the transparency of the map element to the retrieved transparency level. The mapping application will perform this adjustment for all map elements listed in the visual configurations table that appear in overlay 204.

FIG. 4 shows illustrative example 400 of a visual configurations table that indicates pixel selection and contrast adjustment values for a given transparency level, in accordance with some embodiments of the disclosure. Example 400 depicts how the visual configurations data structure may be organized. Three columns are depicted, namely, Transparency Level, Pixel Selection Value, and Contrast Adjustment Value. In example 300, the mapping application utilizes a visual configurations table for adjusting the individual transparencies of map elements in overlay 204 to various degrees. In some embodiments, the mapping application instead adjusts the transparency of overlay 204's various portions based on a universal value (e.g., contrast adjustment). For example, the mapping application identifies a first portion of content 202 and a second portion of overlay 204, such that the first portion and the second portion overlap. A portion represents a collection of neighboring pixels and may be a predetermined shape (e.g., a 5×5 square of pixels) or a map element (e.g., the portion representing Bryant Park from example 100). In this example, the mapping application may identify the portion to be a square in the upper right corner that has a width of 5 pixels and a length of 5 pixels. The mapping application determines a first color of content 202 in the first portion (e.g., blue). Consider that the first level of transparency is 50% according to the visual configurations table in example 400. The mapping application thus adjusts, in the second portion, a second color of overlay 204 to modify contrast between overlay 204 and content 202 based on the first level of transparency.

The mapping application specifically retrieves, from the visual configurations table, the contrast adjustment value 20/100. The contrast adjustment value represents an amount to change the contrast ratio by between the first color and the second color. Referring to a simpler example, if the transparency level is 100% (i.e., completely transparent), the mapping application determines that the contrast adjustment value is 0. This implies that the first color should be the same as the second color, which causes a contrast ratio of 1:1 (i.e., overlay 204 cannot be distinguished from content 202). When the transparency level is 50%, the mapping application selects a second color such that the contrast ratio between the first color and the second color is 120:100 (adding the contrast adjustment value of 20/100 to 100:100). The mapping application then assigns the second color to the second portion of overlay 204. When the second portion is generated for display by the mapping application, it will appear to be a different shade of the first color (e.g., light blue), allowing the second portion to retain the appearance of content 202 while standing out enough to depict the contents of overlay 204. The mapping application may repeat this portion-based contrast adjustment for all portions of overlay 204. It should be noted that the contrast adjustment values in example 400 are for example purposes only and may be different in some embodiments.

The mapping application may alternatively adjust transparency using a pixel selection approach. For example, if the first level of transparency is 50%, the mapping application retrieves the pixel selection value of 50/100, which indicates the selection of half of the pixels in any given portion of overlay 204. To provide a transparent effect, the mapping application sets the color of the selected pixels in overlay 204, to equal the color of the pixels that they overlap in content 202. If the transparency level is 100%, the pixel selection value of 100/100 indicates that all pixels in overlay 204 should share the color of the pixels they overlay in content 202. This essentially makes overlay 204 indistinguishable from content 202 and therefore completely transparent. It should be noted that the mapping application may select the pixels in a randomized manner (e.g., using a RAND function) or in a uniform manner (e.g., if the pixel selection value is 50/100, selecting every other pixel, and if the pixel selection value is 25/100, selecting every fourth pixel).

Figure 5:
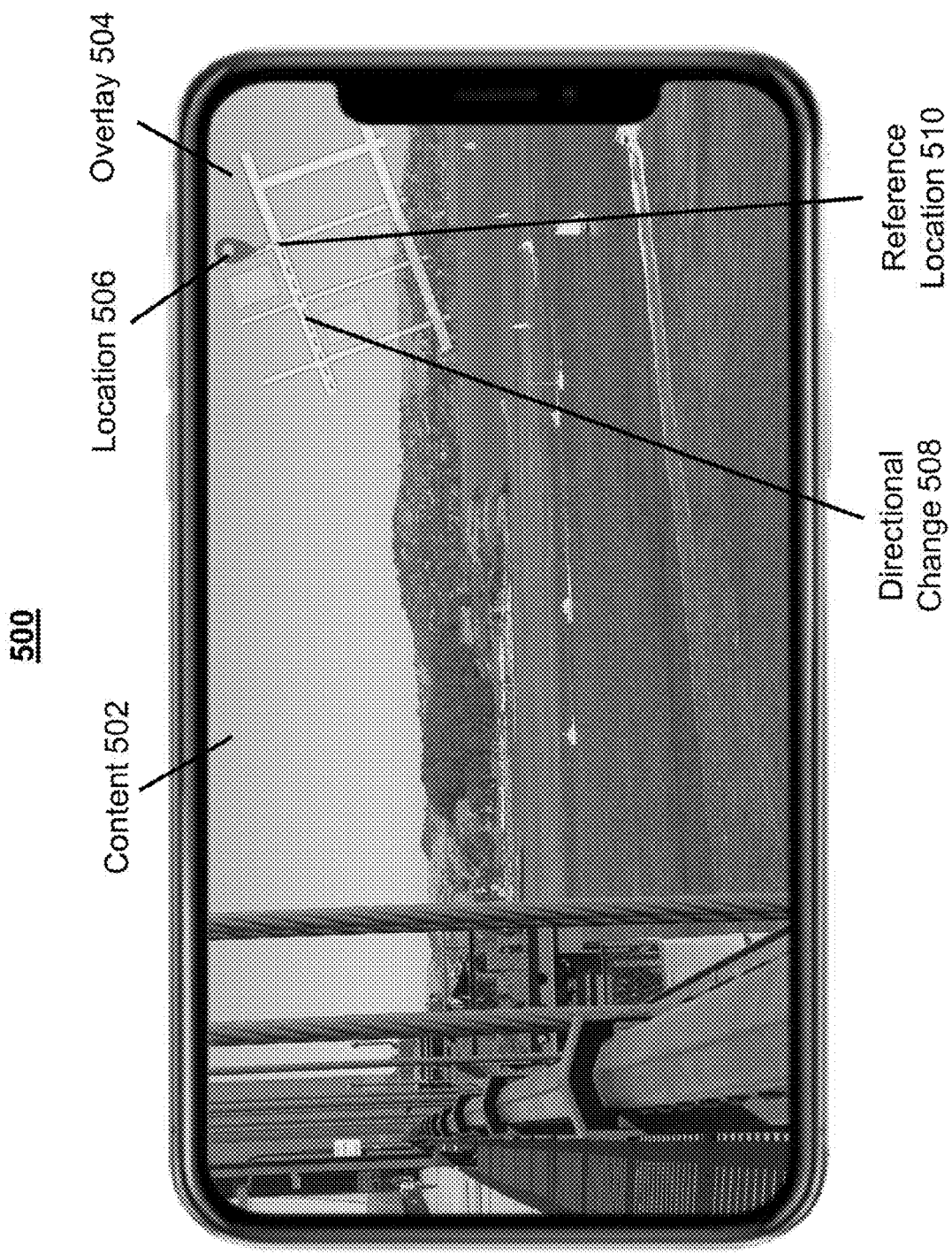
FIG. 5 shows an illustrative example of a map overlay generated over displayed content at a second transparency level when an upcoming directional change is detected, in accordance with some embodiments of the disclosure.

FIG. 5 shows illustrative example 500 of a map overlay generated over displayed content at a second transparency level when an upcoming directional change is detected, in accordance with some embodiments of the disclosure. Example 500 represents what overlay 204 (now overlay 504) will look like after a transparency adjustment. The mapping application determines that location 506 (the updated current location) of the tracked vehicle is within a threshold distance (e.g., 5 meters) from reference location 510 of direction 4. In response to determining that location 506 is within the threshold distance, the mapping application detects directional change 508 and adjusts the transparency of overlay 504 to a second level of transparency. For example, the transparency of overlay 504 may be decreased from the first level of transparency (e.g., 50%) to the second level of transparency (e.g., 25%) to make overlay 504 more prominent relative to content 502.

Examples 300 and 400 discussed specific ways that the mapping application may adjust the transparency of overlay 204 based on upcoming directional changes of a tracked vehicle/device. These adjustments are triggered by an approaching directional change but may also be caused by the visuals of content 502 (e.g., same as content 202 but at a different frame). In some embodiments, the mapping application retrieves, from a content server, metadata indicating all of the frames in content 502. A subset of the frames may be marked by the content provider as "significant," implying that the respective frame should not be obstructed. For example, the subset of frames may depict content that is pivotal to the plot of a movie.

Alternatively, the mapping application may analyze the metadata of content 502 and identify certain frames that correspond to attributes of a user profile. For example, the metadata may indicate the genre of a scene or the cast members in a scene. The mapping application determines whether the genre/cast corresponds to a genre/cast attribute that the user prefers based on his/her user profile (e.g., the user's viewing history indicates that the user frequently watches movies with the cast member or of the genre). In response to determining a correspondence, the mapping application identifies the frames associated with the scene as "significant."

As content 502 plays, the mapping application detects whether a "significant" frame is being displayed. In response to detecting the "significant" frame, the mapping application adjusts the transparency of the map overlay to a third level of transparency (e.g., 75% according to the visual configurations table in example 400).

In the event that mapping application detects a "significant" frame being displayed (e.g., triggering an increase in transparency) and an upcoming directional change (e.g., triggering a decrease in transparency), the mapping application may adjust the transparency to a fourth level of transparency (e.g., 50%). The fourth level of transparency is midway from complete transparency and no transparency, thus striking a balance between the two triggers.

Figure 6:
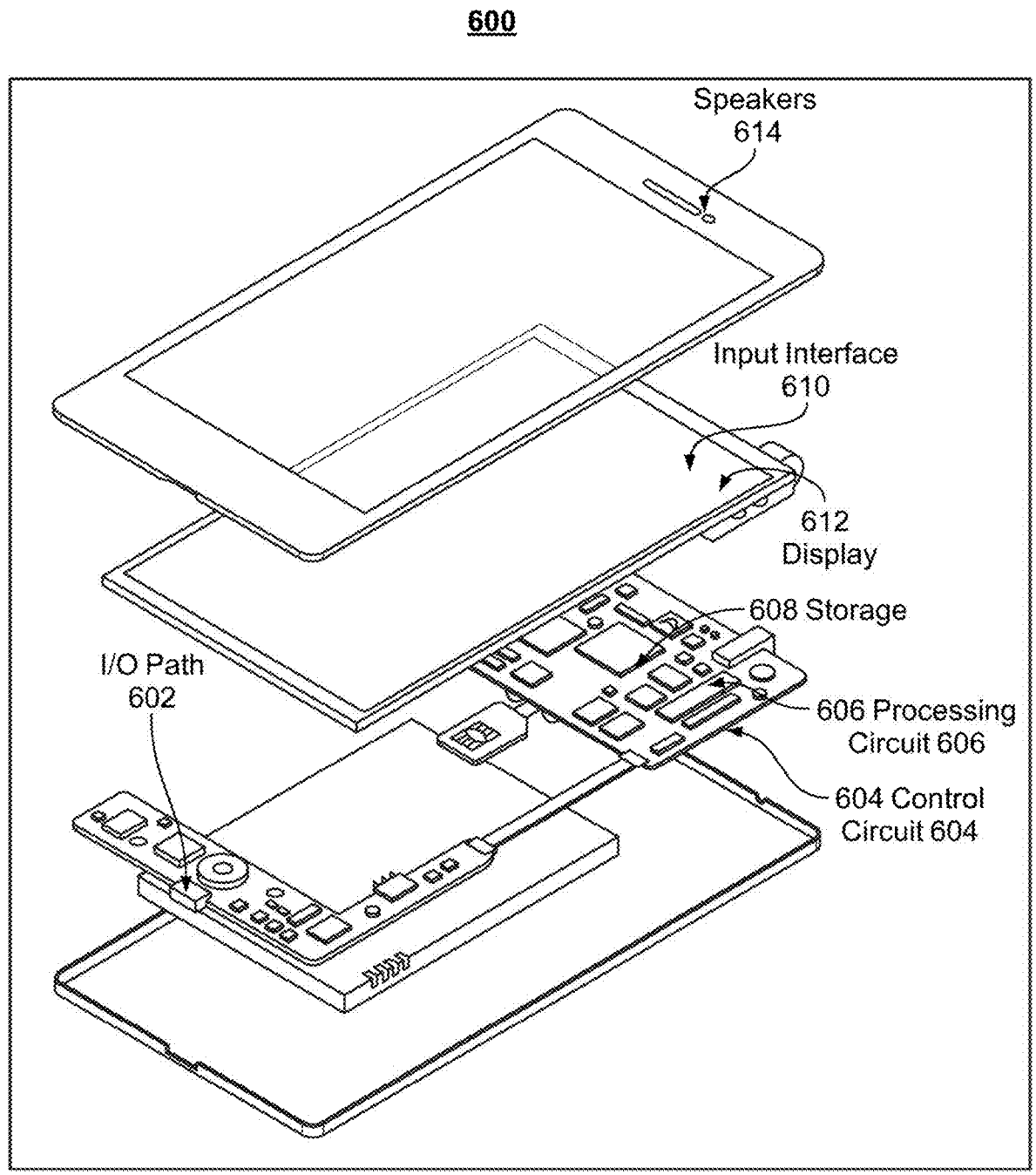
FIG. 6 is a diagram of an illustrative device, in accordance with some embodiments of the disclosure.

FIG. 6 shows a generalized embodiment of illustrative device 600. As depicted in FIG. 6, device 600 is a smartphone. However, device 600 is not limited to smartphones and may be any computing device. For example, device 600 of FIG. 6 can be implemented in system 700 of FIG. 7 as device 702 (e.g., a smartphone, a smart television, a tablet, a computer, or any combination thereof).

Device 600 may receive data via input/output (hereinafter I/O) path 602. I/O path 602 may provide received data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a mapping application stored in memory (i.e., storage 608).

A mapping application may be a stand-alone application implemented on a device or a server. The mapping application may be implemented as software or a set of executable instructions. The instructions for performing any of the embodiments discussed herein of the mapping application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6, the instructions may be stored in storage 608, and executed by control circuitry 604 of a device 600.

In some embodiments, a mapping application may be a client-server application where only the client application resides on device 600 (e.g., device 702), and a server application resides on an external server (e.g., map server 706). For example, a mapping application may be implemented partially as a client application on control circuitry 604 of device 600 and partially on map server 706 as a server application running on control circuitry. Map server 706 may be a part of a local area network with device 702, or may be part of a cloud computing environment accessed via the Internet. In a cloud computing environment, various types of computing services for performing searches on the Internet or informational databases, providing storage (e.g., for the database of notable landmarks) or parsing data are provided by a collection of network-accessible computing and storage resources (e.g., map server 706), referred to as "the cloud." Device 600 may be a cloud client that relies on the cloud computing capabilities from map server 706 to generate the virtual map and content server 708 for overlay area identification. When executed by control circuitry of map server 706, the mapping application may instruct the control circuitry to adjust the size of the display area and transmit the size dimensions to device 702. The client application may instruct control circuitry of the receiving device 702 to generate the mapping application output. Alternatively, device 702 may perform all computations locally via control circuitry 604 without relying on map server 706 or content server 708.

Control circuitry 604 may include communications circuitry suitable for communicating with a mapping application server or other networks or servers. The instructions for carrying out the above-mentioned functionality may be stored and executed on map server 706 and/or content server 708. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on map server 706 and/or content server 708) may be used to supplement storage 608 or instead of storage 608.

A user may send instructions to control circuitry 604 using user input interface 610 of device 600. User input interface 610 may be any suitable user interface touchscreen, touchpad, stylus and may be responsive to external device add-ons such as a remote control, mouse, trackball, keypad, keyboard, joystick, voice recognition interface, or other user input interfaces. Display 610 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Display circuitry, which comprises display 612 and any graphics card linked with display 612, generates displays of the map overlay and the display content on device 600. Speakers 614 may be provided as integrated with other elements of user equipment device 600 or may be stand-alone units. In some embodiments, the audio may be distributed to a receiver (not shown), which processes and outputs the audio via speakers 614.

Control circuitry 604 may allow a user to provide user profile information or may automatically compile user profile information. For example, control circuitry 604 may monitor the user's visit history to identify notable landmarks for the user. Additionally, control circuitry 604 may obtain all or part of other user profiles that are related to a particular user (e.g., via social media networks), and/or obtain information about the user from other sources that control circuitry 604 may access. As a result, a user can be provided with a unified experience across the user's different devices. The user profile may specifically be used to prioritize certain locations on a virtual map for inclusion. For example, the user profile may include a record of user-selected landmarks.

Figure 7:
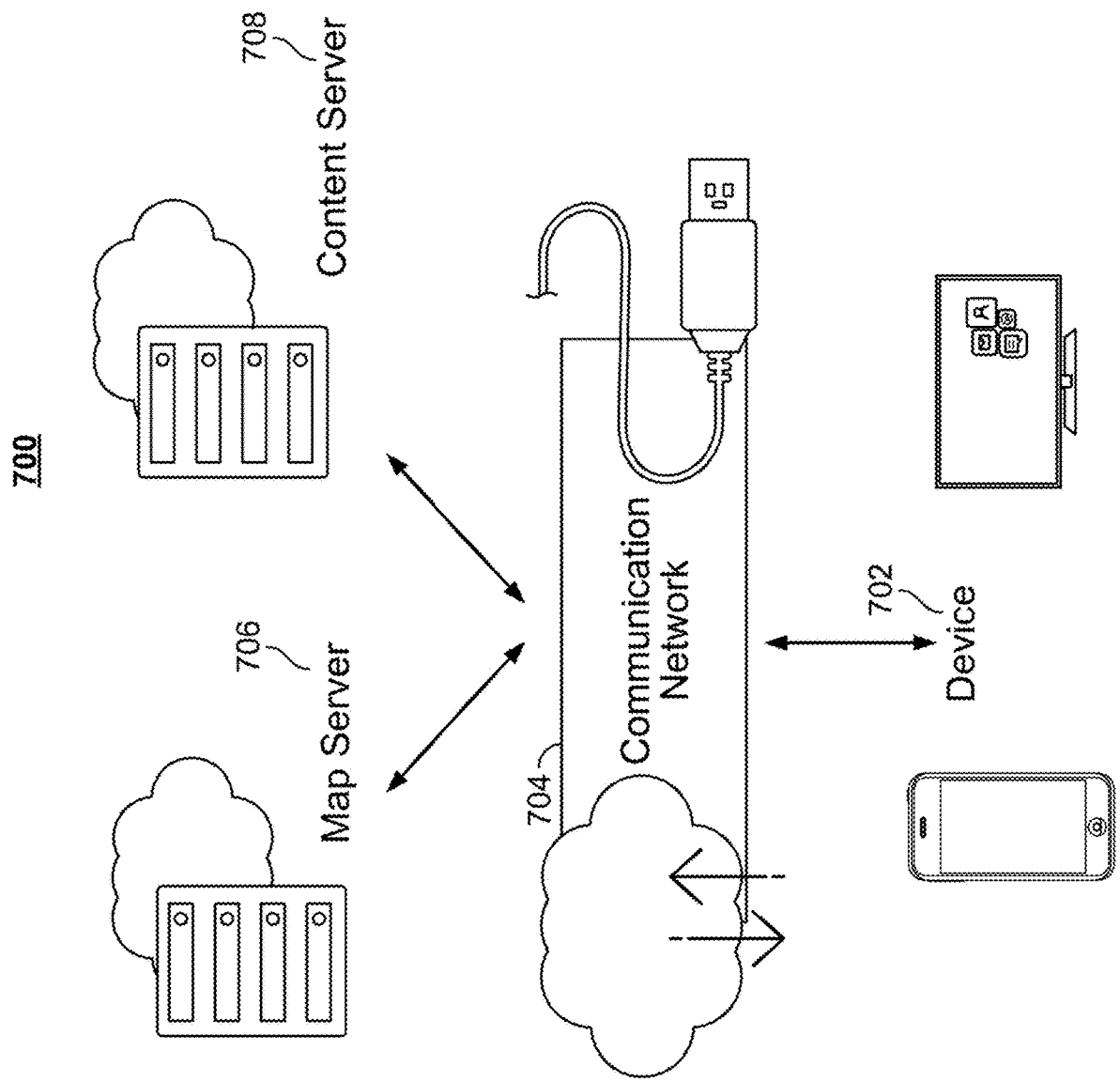
FIG. 7 is a diagram of an illustrative media system, in accordance with some embodiments of the disclosure.

As depicted in FIG. 7, device 702 may be coupled to communication network 704. Communication network 704 may be one or more networks including the Internet, a mobile phone network, mobile voice or data network (e.g., a 4G or LTE network), cable network, public switched telephone network, Bluetooth, or other types of communication network or combinations of communication network. Thus, device 702 may communicate with map server 706 and content server 708 over communication network 704 via communications circuitry described above. Map server 706 provides map information to device 702 and may also implement various processes such as landmark identification and overlay generation. Content server 708 provides content (e.g., videos, images, games, etc.) to device 702 and may also provide metadata of the content indicating overlay areas. In should be noted that there may be more than one map server 706 and/or content server 708, but only one of each is shown in FIG. 7 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communication path or combination of such paths.

Figure 8:
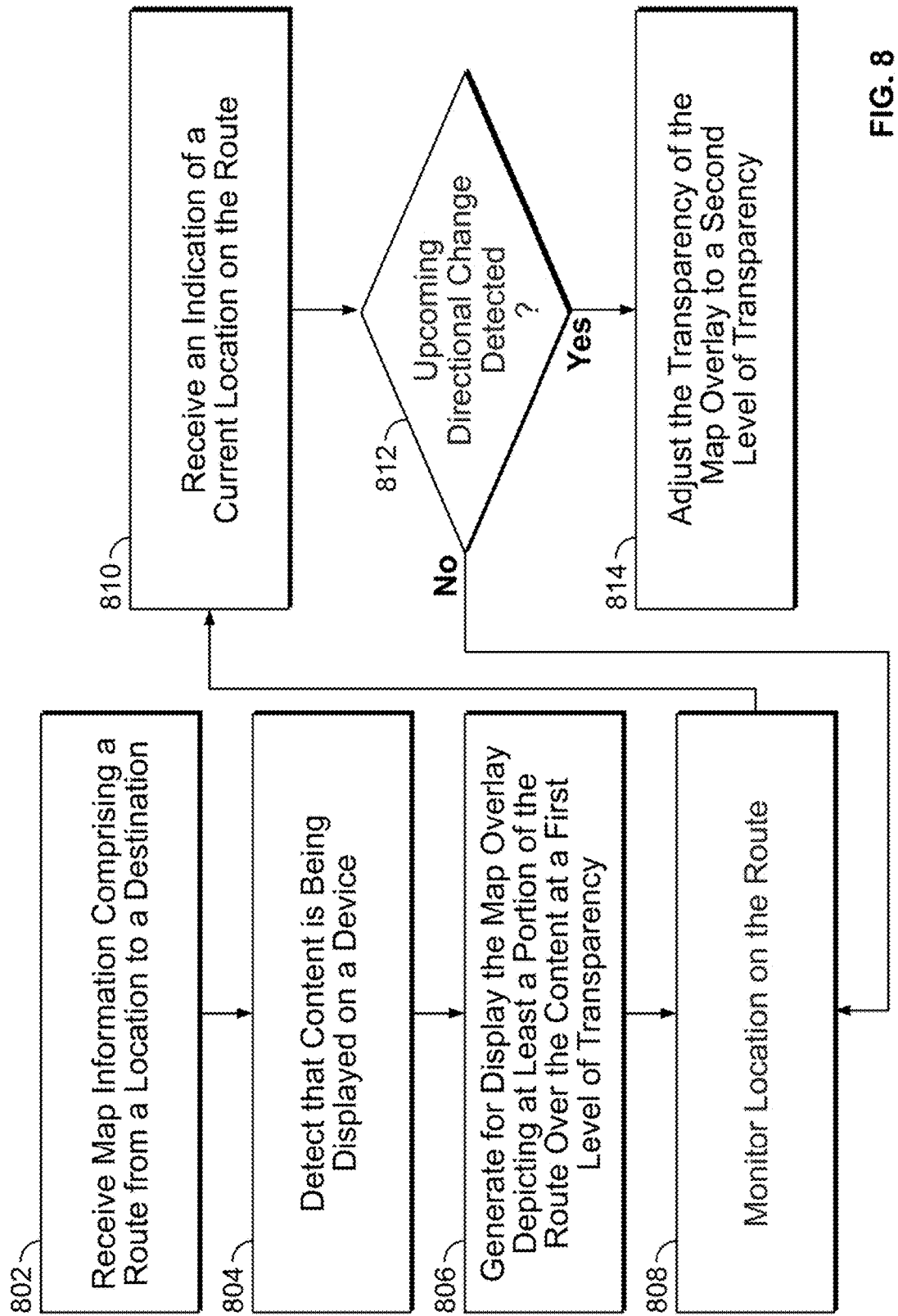
FIG. 8 is a flowchart of an illustrative process for adjusting the transparency of a map overlay based on upcoming directional changes on a route, in accordance with some embodiments of the disclosure.

FIG. 8 is a flowchart of illustrative process 800 for adjusting the transparency of a map overlay based on upcoming directional changes on a route, in accordance with some embodiments of the disclosure. At 802, control circuitry 604 receives map information (e.g., from map server 706 over communication network 704) comprising a route from a location to a destination. For example, control circuitry 604 receives information about route 102, in which a tracked vehicle/device is heading from Walgreens to Hotel New York. At 804, control circuitry 604 detects that content (e.g., as retrieved from content server 708 over communication network 704) is being displayed on device 702 (e.g., via display 612). For example, control circuitry 604 may detect that content 202 (e.g., a video) is being generated for display.

At 806, control circuitry 604 generates for display (e.g., via display 612) the map overlay (e.g., overlay 204) depicting at least a portion of the route over the content at a first level of transparency. For example, control circuitry 604 may generate overlay 204 over content 202 using the Initial Transparency Level indicated in the visual configurations table (e.g., stored in storage 608 of device 702 and/or map server 706) of example 300. Control circuitry 604 further retrieves a threshold display distance value (e.g., 100 meters) from storage 608. The threshold display distance value may represent a diameter of the overlay 204 in which the location of the tracked device is at the center. Accordingly, as the location of the tracked device changes, the portion of the route displayed in overlay 204 changes as well. If the length of the route is less than the threshold display distance value, control circuitry 604 generates overlay 204 depicting the entirety of the route.

At 808, control circuitry 604 monitors the location of the tracked device/vehicle on the route (e.g., as the location changes from location 206 to location 506 in real time). At 810, control circuitry 604 receives an indication of a current location on the route. For example, control circuitry 604 receives the GPS coordinates of location 506. At 812, control circuitry 604 determines whether a directional change is upcoming based on the indication. The determination of whether a directional change is upcoming is further explained in processes 1000 and 1100. Referring to example 500, control circuitry 604 determines that location 506 is within a threshold distance (e.g., retrieved from storage 608) from reference location 510. Because reference location 510 is linked with directional change 508 (e.g., as may be indicated by map information received from map server 706), control circuitry 604 determines that a directional change is upcoming. In response to determining that a directional change is upcoming, at 814, control circuitry 604 adjusts the transparency of the map overlay to a second level of transparency (e.g., 25% in reference to the visual configurations table of example 400 or the map element adjustments indicated in Directional Change Transparency Level in reference to the visual configurations table of example 300). In response to determining that a directional change is not upcoming, process 800 returns to 808, where control circuitry 604 continues to monitor the location on the route.

Figure 9:
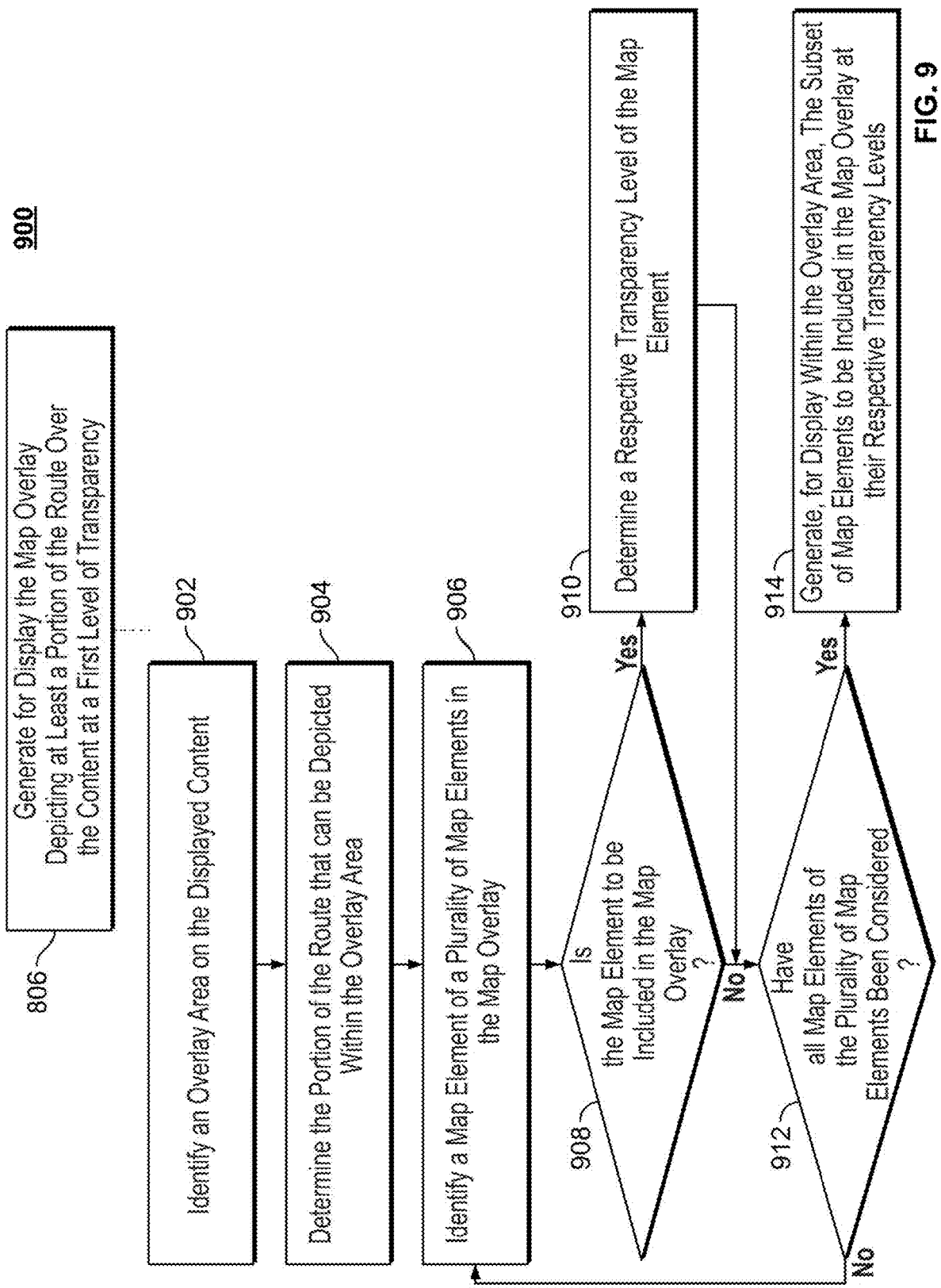
FIG. 9 is a flowchart of an illustrative process for generating for display the map overlay in an overlay area, in accordance with some embodiments of the disclosure.

FIG. 9 is a flowchart of illustrative process 900 for generating for display the map overlay in an overlay area, in accordance with some embodiments of the disclosure. Process 900 elaborates on 806 of process 800. At 902, control circuitry 604 identifies an overlay area on the displayed content (e.g., content 202). In some embodiments, control circuitry 604 analyzes a frame of the display content and identifies a portion of the frame not occupied by marked objects. Marked objects are predetermined objects that are not to be obstructed. For example, control circuitry 604 retrieves, from storage 608, a list of marked objects (e.g., faces, animals, logos, game scores, etc.) and uses object recognition (i.e., image classification) to determine the positions and portions of the frame that the marked objects occupy. Control circuitry 604 subsequently selects a portion in the frame not occupied by a marked object and identifies the portion as the overlay area.

At 904, control circuitry 604 determines the portion of the route that can be depicted within the overlay area. For example, control circuitry 604 retrieves a threshold display distance value (e.g., 100 meters) from storage 608 and determines that at any given time, at most 100 meters of the route should be displayed in the overlay.

At 906, control circuitry 604 identifies a map element (e.g., "terrain" in example 300) of a plurality of map elements in the map overlay (e.g., stored in storage 608). At 908, control circuitry 604 determines whether the map element is to be included in the map overlay. For example, control circuitry 604 may refer to the user profile for personalized settings indicating that the map element "terrain" should be included (i.e., displayed) in the map overlay. In response to determining that the map element is to be included, process 900 proceeds to 910, where control circuitry 604 determines a respective transparency level of the map element. For example, the Initial Transparency Level column in FIG. 3 indicates that the transparency level for "terrain" is 100%.

Subsequently at 912, control circuitry 604 determines whether all map elements of the plurality of map elements have been considered for inclusion in the map overlay. For example, in FIG. 3, the visual configurations table may include 100 map elements. Control circuitry 604 will consider each map element to determine whether the respective map element should be rendered in the overlay. In response to determining that not all map elements have been considered, process 900 returns to 906. This initiates another loop through steps 906 and 912. In one example, control circuitry 604 may go through the loop between 906 and 912 multiple times and may thus identify multiple map elements to be included in the map overlay along with their respective transparency levels. In certain instances, at 908, control circuitry 604 may determine that the map element is not to be included in the map overlay and will skip 910 to proceed to 912.

When all map elements of the plurality of map elements have been considered, control circuitry 604 will exit the loop at 912 and process 900 will end at 914, where control circuitry 604 generates, for display within the overlay area, the subset of map elements to be included in the map overlay at their respective transparency levels. The generation of the overlay is performed according to a visual configuration retrieved from memory (e.g., storage 608) by control circuitry 604. The visual configuration provides information on text font, font size, indicator colors, indicator size, street width, and route line appearance. For example, the control circuitry 604 may generate overlay 204 such that the font for text is "Arial," the font size is "10 pt.," the street width is 20 pixels, the route line is a dotted line, and the indicator colors are based on a color palette including blue, orange, red, and white. The initial scale of landmarks is determined by control circuitry 604 based on the street width in pixels (e.g., 1:2). The visual configuration may be adjusted by the user and linked to the user profile of the user.

Figure 10:
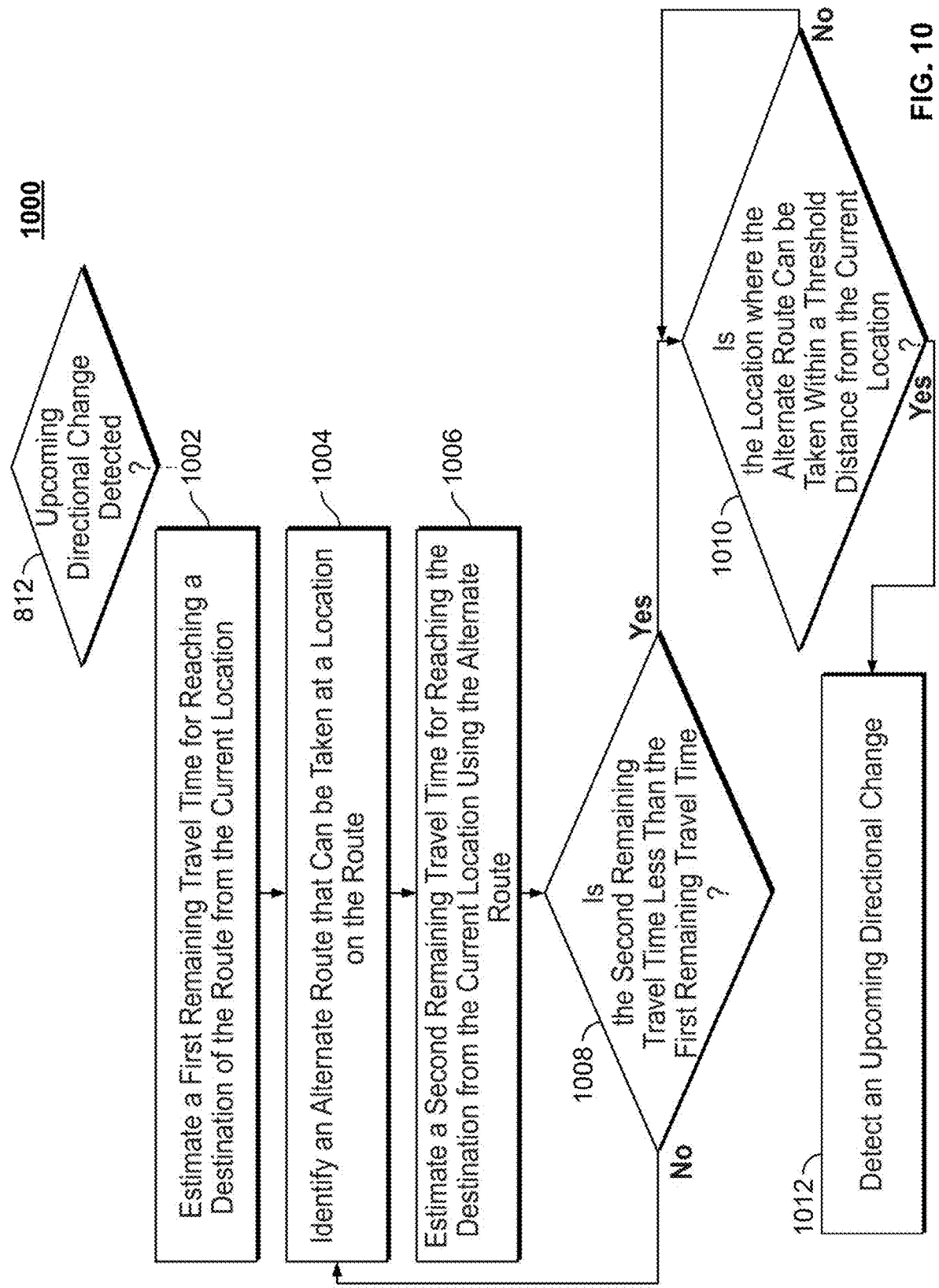
FIG. 10 is a flowchart of an illustrative process for detecting an upcoming directional change based on identifying faster routes that can be taken, in accordance with some embodiments of the disclosure.

FIG. 10 is a flowchart of illustrative process 1000 for detecting an upcoming directional change based on identifying faster routes that can be taken, in accordance with some embodiments of the disclosure. Process 1000 elaborates on 812 of process 800. At 1002, control circuitry 604 estimates a first remaining travel time for reaching a destination of the route from the current location. For example, control circuitry 604 may determine that, based on the current speed of the tracked vehicle/device and the remaining distance on the route, there are 10 minutes remaining for completing navigation on the route. At 1004, control circuitry 604 identifies an alternate route that can be taken at a location on the route. For example, control circuitry 604 may continuously search for alternate routes that can be taken such that the remaining travel time can be reduced. Control circuitry 604 may determine that in an upcoming intersection, taking a left turn will reduce the remaining travel time. Therefore, control circuitry 604 identifies this new path, which involves taking a left turn at the upcoming intersection, as the alternate route. At 1006, control circuitry 604 estimates a second remaining travel time (e.g., 8 minutes) for reaching the destination from the current location using the alternate route.

At 1008, control circuitry 604 determines whether the second remaining travel time is less than the first remaining travel time. In response to determining that the second remaining travel time is not less than the first remaining travel time, process 1000 returns to 1004 where control circuitry 604 identifies a different alternate route. In response to determining that the second remaining travel time is less than the first remaining travel time, process 1000 proceeds to 1010, where control circuitry 604 determines whether the location where the alternate route can be taken is within a threshold distance from the current location. For example, control circuitry 604 may determine that the upcoming intersection, where a left turn can be taken, is 20 meters away. Control circuitry 604 retrieves the threshold distance (e.g., 30 meters) from storage 608 to compare with the distance to the location. In response to determining that the alternate route can be taken within the threshold distance (i.e., determining that 20 meters is less than the threshold 30 meters), at 1012, control circuitry 604 detects the upcoming directional change. In response to determining that the current location is not within the threshold distance, control circuitry 604 repeats 1010. In other words, control circuitry 604 waits for the tracked device/vehicle to get closer within range of the point where an alternate route is to be taken.

Figure 11:
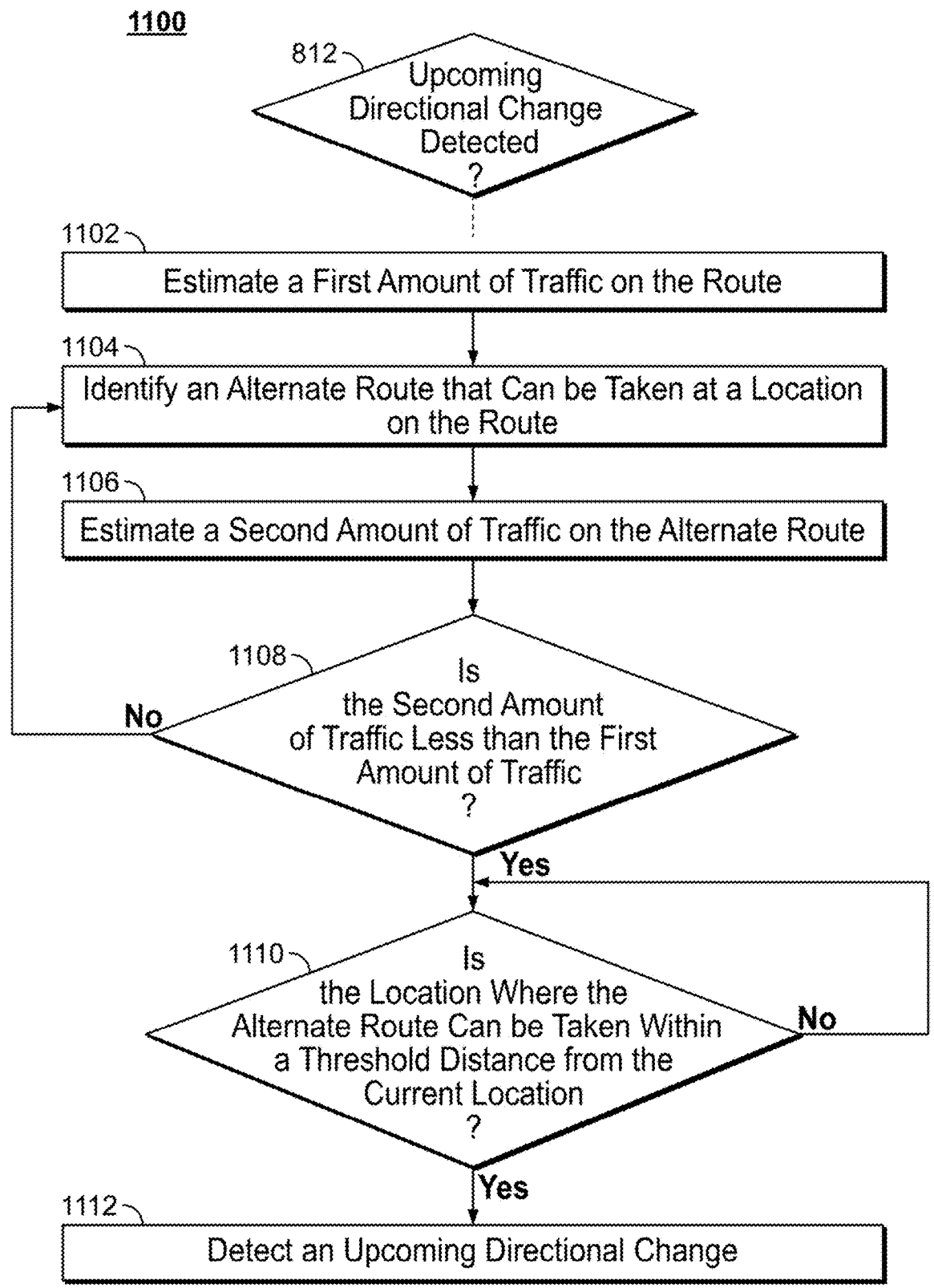
FIG. 11 is a flowchart of an illustrative process for detecting an upcoming directional change based on identifying traffic on the route, in accordance with some embodiments of the disclosure.

FIG. 11 is a flowchart of illustrative process 1100 for detecting an upcoming directional change based on identifying traffic on the route, in accordance with some embodiments of the disclosure. Process 1100 elaborates on 812 of process 800. At 1102, control circuitry 604 estimates a first amount of traffic on the route. For example, control circuitry 604 may retrieve live traffic updates from map server 706. The traffic updates may indicate an average delay in travel time on a particular road and a current delay in travel time on the particular road (e.g., due to construction, accidents, road closings, etc.). Control circuitry 604 calculates the difference between the average delay time and the current delay time and identifies the difference as the amount of traffic. In this case, smaller differences indicate little traffic and larger differences indicate heavier traffic. At 1104, control circuitry 604 identifies an alternate route that can be taken at a location on the route. For example, control circuitry 604 may determine that a left turn can be taken at the upcoming intersection (e.g., approaching in 20 meters on the route).

At 1106, control circuitry 604 estimates a second amount of traffic on the alternate route (e.g., based on the traffic updates received from map server 706). At 1108, control circuitry 604 determines whether the second amount of traffic is less than the first amount of traffic. For example, the first amount of traffic may be represented by a delay difference of 3 minutes and the second amount of traffic may be represented by a delay difference of 30 seconds. In response to determining that the second amount of traffic is not less than the first amount of traffic, process 1100 returns to 1104, where control circuitry 604 identifies a different alternate route. In response to determining that the second amount of traffic is less than the first amount of traffic, process 1100 proceeds to 1110, where control circuitry 604 determines whether the location where the alternate route can be taken is within a threshold distance (e.g., 30 meters) from the current location. In response to determining that the alternate route can be taken within the threshold distance, at 1112, control circuitry 604 detects the upcoming directional change. In response to determining that the current location is not within the threshold distance, control circuitry 604 repeats 1110. In other words, control circuitry 604 waits for the tracked device/vehicle to get closer within range of the point where an alternate route is to be taken.

Figure 12:
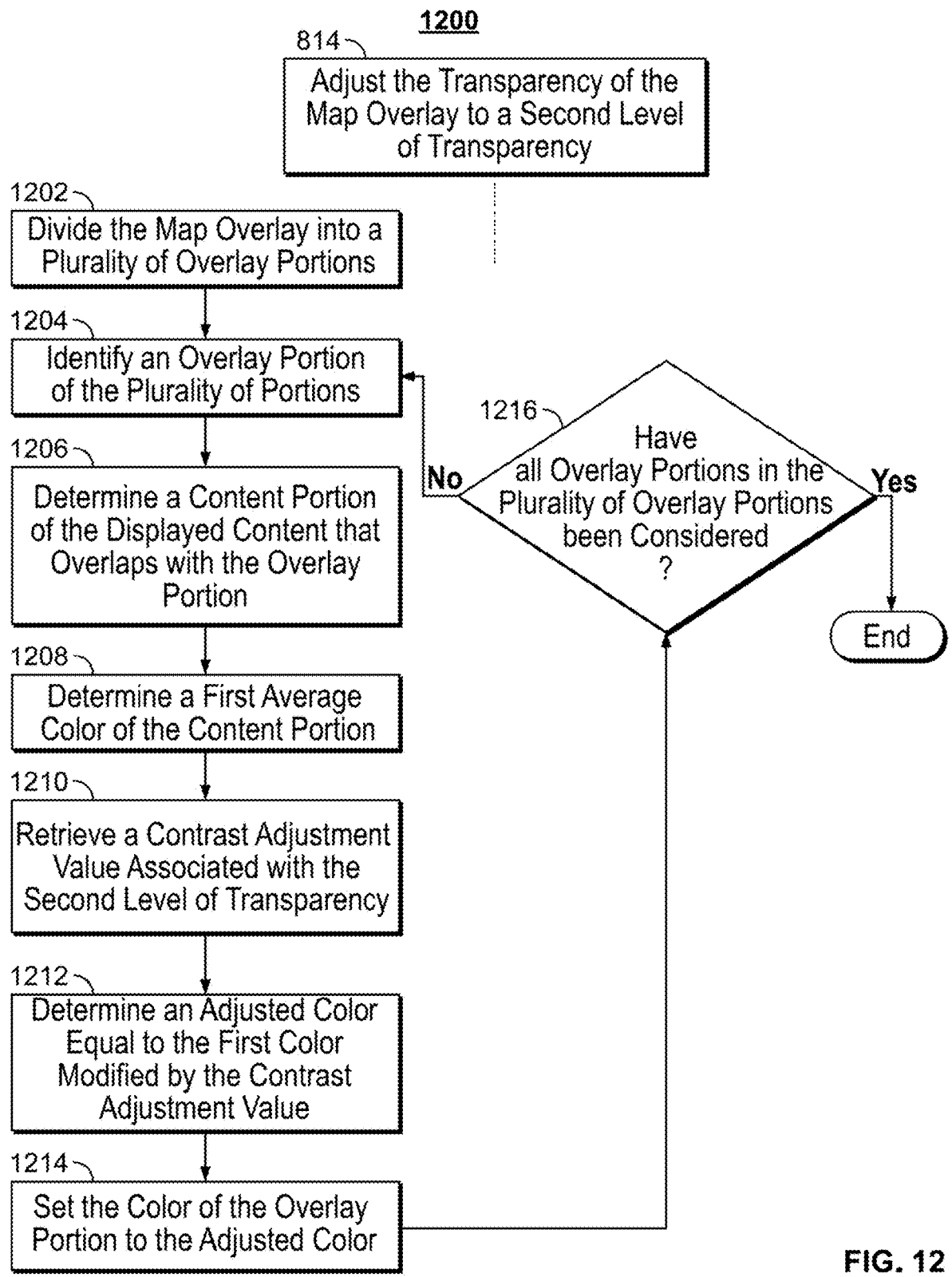
FIG. 12 is a flowchart of an illustrative process for adjusting the transparency of the map overlay by modifying the color of the map overlay, in accordance with some embodiments of the disclosure.

FIG. 12 is a flowchart of illustrative process 1200 for adjusting the transparency of the map overlay by modifying the color of the map overlay, in accordance with some embodiments of the disclosure. Process 1200 elaborates on 814 of process 800. At 1202, control circuitry 604 divides the map overlay into a plurality of overlay portions. For example, control circuitry 604 divides the map overlay into a grid of 5×5 pixel squares. At 1204, control circuitry 604 identifies an overlay portion of the plurality of portions. For example, control circuitry 604 identifies a first 5×5 pixel square in the top left corner of the map overlay. At 1206, control circuitry 604 determines a content portion of the displayed content that overlaps with the overlay portion.

This content portion may be a 5×5 pixel square directly underneath the 5×5 pixel square of the map overlay. At 1208, control circuitry 604 determines a first average color of the content portion. For example, control circuitry 604 determines a color value for each pixel in the 5×5 pixel square of the content and determines, based on the color values of the 25 pixels in the square (e.g., different shades of blue), an average color (e.g., blue).

At 1210, control circuitry 604 retrieves a contrast adjustment value associated with the second level of transparency. For example, the second level of transparency may be 25% (referring to example 800). Control circuitry 604 retrieves, from the visual configurations table in example 400 (e.g., stored in storage 608), the value of 30/100 from the Contrast Adjustment Value column. At 1212, control circuitry 604 determines an adjusted color equal to the first color modified by the contrast adjustment value. For example, control circuitry 604 determines a shade of blue as adjusted with the value of 30/100. At 1214, control circuitry 604 sets the color of the overlay portion to the adjusted color. At 1216, control circuitry 604 determines whether all overlay portions in the plurality of portions have been considered. In response to determining that they have not, process 1200 returns to 1204. At 1204, control circuitry 604 selects the next portion of the map overlay (e.g., a neighboring 5×5 pixel square). Otherwise, if all portions have been considered, process 1200 ends.

Figure 13:
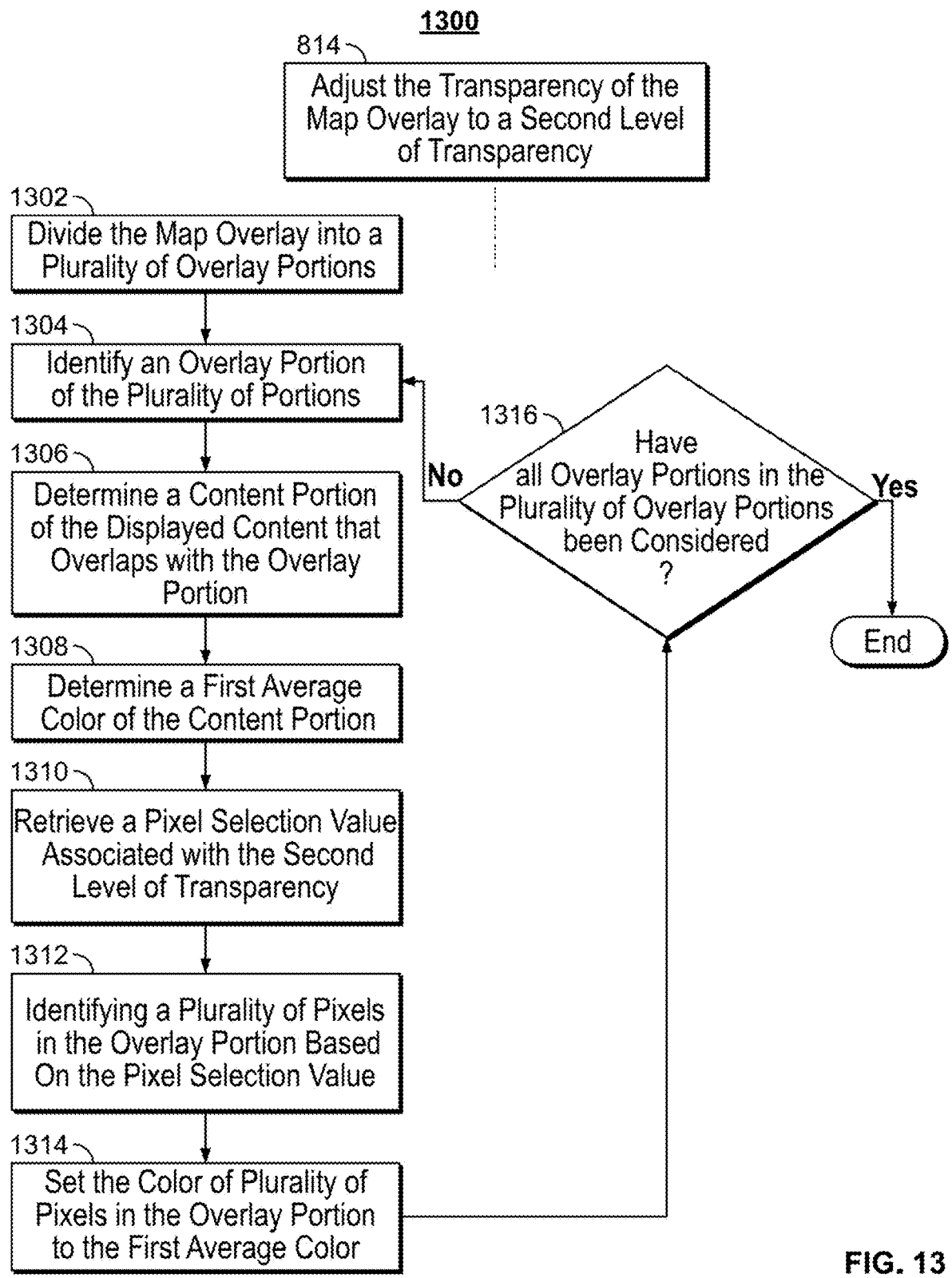
FIG. 13 is a flowchart of an illustrative process for adjusting the transparency of the map overlay by altering a subset of pixels in the map overlay, in accordance with some embodiments of the disclosure.

FIG. 13 is a flowchart of illustrative process 1300 for adjusting the transparency of the map overlay by altering a subset of pixels in the map overlay, in accordance with some embodiments of the disclosure. Process 1300 elaborates on 814 of process 800 and, for continuity, refers to the same example of the 5×5 pixel squares in process 1200. At 1302, control circuitry 604 divides the map overlay into a plurality of overlay portions (e.g., the 5×5 pixel squares). At 1304, control circuitry 604 identifies an overlay portion of the plurality of portions (e.g., the top-left-most 5×5 pixel square).

At 1306, control circuitry 604 determines a content portion of the displayed content that overlaps with the overlay portion. At 1308, control circuitry 604 determines a first average color of the content portion (e.g., blue). At 1310, control circuitry 604 retrieves a pixel selection value associated with the second level of transparency (e.g., 25/100). At 1312, control circuitry 604 identifies a plurality of pixels in the overlay portion based on the pixel selection value. For example, control circuitry 604 may select every fourth pixel in the 5×5 pixel square. At 1314, control circuitry 604 sets the color of plurality of pixels in the overlay portion to the first average color. For example, control circuitry 604 sets the color of the selected pixels to blue. At 1316, control circuitry 604 determines whether all overlay portions in the plurality of portions have been considered. In response to determining that they have not, process 1300 returns to 1304. Otherwise, process 1300 ends.

Figure 14:
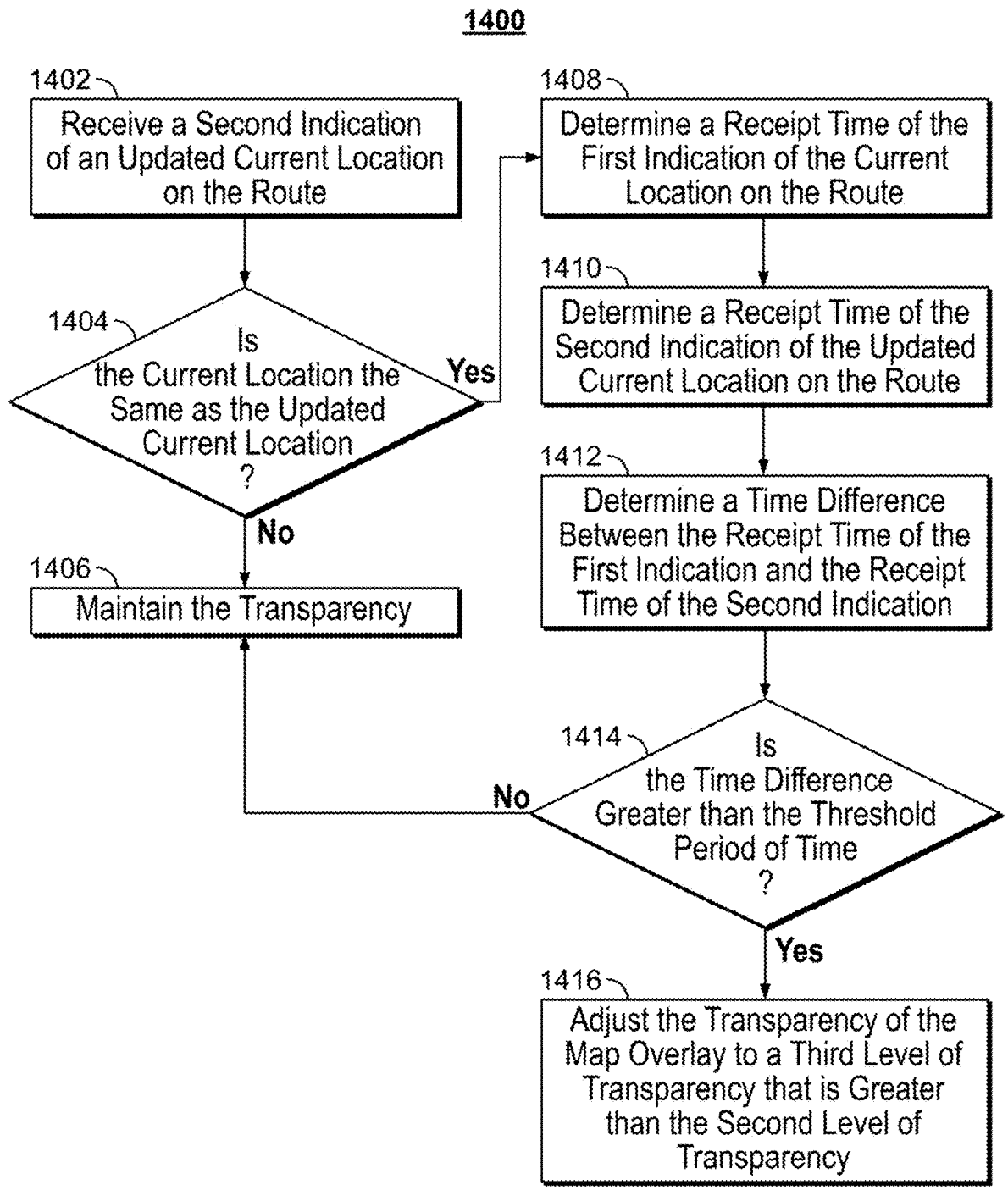
FIG. 14 is a flowchart of an illustrative process for adjusting the transparency of the map overlay in response to detecting that the current location has not changed for a threshold period of time, in accordance with some embodiments of the disclosure.

FIG. 14 is a flowchart of illustrative process 1400 for adjusting the transparency of the map overlay in response to detecting that the current location has not changed for a threshold period of time, in accordance with some embodiments of the disclosure. At 1402, control circuitry 604 receives a second indication of an updated current location on the route (e.g., from map server 706 via communication network 704). For example, control circuitry 604 may receive GPS coordinates of the tracked vehicle/device. At 1404, control circuitry 604 determines whether the current location is the same as the updated current location. For example, control circuitry 604 compares the respective GPS coordinates of the previously received current location and the updated current location.

In response to determining that the current location is the same as the updated current location, at 1408, control circuitry 604 determines a receipt time of the first indication (e.g., 6:01 pm) of the current location on the route. In response to determining that the current location is not the same as the updated current location, at 1406, control circuitry 604 maintains the transparency. At 1410, control circuitry 604 determines a receipt time of the second indication (e.g., 6:03 pm) of the updated current location on the route. At 1412, control circuitry 604 determines a time difference between the receipt time of the first indication and the receipt time of the second indication (e.g., 2 minutes).

At 1414, control circuitry 604 determines whether the time difference is greater than the threshold period of time. For example, control circuitry 604 may retrieve the threshold period of time (e.g., 40 seconds) from a user profile stored in storage 608. In response to determining that the time difference is greater than the threshold period of time, at 1416, control circuitry 604 adjusts the transparency of the map overlay to a third level of transparency (e.g., 75%) that is greater than the second level of transparency (e.g., 25%). In this example, because the tracked vehicle/device has not changed its position for a period of time, control circuitry 604 increases the transparency of the map overlay and, as a result, reduces the obstruction over the displayed content. Alternatively, in response to determining that the time difference is not greater than the threshold period of time, process 1400 returns to 1406, where control circuitry 604 maintains the transparency of the map overlay.

It should be noted that processes 800-1400 or any step thereof could be performed on, or provided by, any of the devices shown in FIGS. 6-7. For example, the processes may be executed by control circuitry 604 (FIG. 6) as instructed by a mapping application implemented on device 702 and/or servers 706 and/or 708. In addition, one or more steps of a process may be incorporated into or combined with one or more steps of any other process or embodiment (e.g., steps from process 800 may be combined with steps from process 900). In addition, the steps and descriptions described in relation to FIGS. 8-11 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method for adjusting a transparency of a map overlay, the method comprising:
   generating for display a content item at a device;
   generating for display, at a first level of transparency, a map overlay concurrently displayed over the content item at the device, wherein the map overlay comprises a depiction of at least a portion of a route and a first location of the device;

receiving, from a global-positioning system, location data corresponding to a current location of the device;

automatically modifying the depiction of the first location of the device to depict a second location corresponding to the current location of the device based on the location data;

detecting, based on the current location and the route, a directional change for the route, wherein a map component of the map overlay depicts the directional change; and in response to detecting the directional change:
automatically adjusting the transparency of the map overlay to a second level of transparency, wherein the second level of transparency corresponds to a ratio between values corresponding to pixels of the map overlay and values corresponding to pixels of the content item displayed concurrently with the map overlay; and automatically adjusting the transparency of the map component depicting the directional change to a third level of transparency less than the second level of transparency such that pixels of the map component depicting the directional change are prominently displayed against the pixels of the content item displayed concurrently with the map overlay at the device.

2. The method of claim 1, wherein the content item is unrelated to a mapping application generating the map overlay for display at the device.

3. The method of claim 1, further comprising:
retrieving metadata of the content item, wherein the metadata indicates an upcoming significant frame; and
in response to detecting the upcoming significant frame, adjusting the transparency of the map overlay to a fourth level of transparency greater than the second level of transparency.

4. The method of claim 1, wherein automatically adjusting the transparency of the map overlay to the second level of transparency comprises:
identifying a first portion of the content item and a second portion of the map overlay, wherein the first portion and the second portion overlap;
determining a first color of the first portion; and
adjusting, in the second portion, a second color to modify contrast between the map overlay and the content item based on the second level of transparency.

5. The method of claim 4, wherein the adjusting, in the second portion, the second color comprises:
selecting a plurality of pixels in the second portion of the map overlay based on the second level of transparency; and
setting the second color of the plurality of pixels to the first color.

6. The method of claim 1, wherein the second level of transparency is less than the first level of transparency.

7. The method of claim 1, further comprising:
determining a receipt time of data corresponding to the first location;
in response to determining that (1) the first location is the same as the second location and (2) a threshold period of time has elapsed since the receipt time, adjusting the transparency of the map overlay to a fourth level of transparency that is greater than the second level of transparency, wherein the fourth level of transparency corresponds to a greater ratio between the values corresponding to the pixels of the map overlay and the values corresponding to the pixels of the content item than the ratio corresponding to the second level of transparency.

8. The method of claim 1, wherein detecting the directional change further comprises:
identifying a plurality of directions in the route, wherein each direction of the plurality of directions is triggered at a respective reference location;
determining whether the current location is within a threshold distance from the respective reference location of a direction of the plurality of directions; and
in response to determining that the current location is within the threshold distance from the respective reference location, detecting the directional change.

9. The method of claim 1, wherein detecting the directional change further comprises:
estimating at least one of a remaining travel time for reaching a destination of the route or an amount of traffic for reaching the destination of the route;
identifying an alternate route that can be taken at a location on the route, wherein the identifying the alternate route comprises at least one of:
determining that the alternate route reduces the remaining travel time for reaching the destination; or
determining that the alternate route reduces the amount of traffic for reaching the destination; and
in response to determining that the current location is within a threshold distance from the location, detecting the directional change.

10. The method of claim 1, further comprising:
adjusting a respective transparency value of a respective portion of the map overlay that depicts a location of interest, in response to determining that the location of interest is listed in a user profile, wherein the respective transparency value of the respective portion of the map overlay corresponds to a transparency value corresponding to the transparency of the map overlay.

11. A system for adjusting a transparency of a map overlay, the system comprising:
display circuitry configured to:
generate for display a content item at a device; and
generate for display, at a first level of transparency, a map overlay concurrently displayed with the content item at the device, wherein the map overlay comprises a depiction of at least a portion of a route and a first location of the device; and
control circuitry configured to:
receive, from a global-positioning system, location data corresponding to a current location of the device;
automatically modify the depiction of the first location of the device to depict a second location corresponding to the current location of the device based on the location data;
detect, based on the current location and the route, a directional change for the route, wherein a map component of the map overlay depicts the directional change; and
in response to detecting the directional change:
automatically adjust the transparency of the map overlay to a second level of transparency, wherein the second level of transparency corresponds to a ratio between values corresponding to pixels of the map overlay and values corresponding to pixels of the content item displayed concurrently with the map overlay; and automatically adjust the transparency of the map component depicting the directional change to a third level of transparency less than the second level of transparency such that pixels of the map component depicting the directional change are prominently displayed against the pixels of the content item displayed concurrently with the map overlay at the device.

12. The system of claim 11, wherein the content item is unrelated to a mapping application generating the map overlay for display at the device.

13. The system of claim 11, wherein the control circuitry is further configured to:
retrieve metadata of the content item, wherein the metadata indicates an upcoming significant frame; and
in response to detecting the upcoming significant frame, adjust the transparency of the map overlay to a fourth level of transparency greater than the second level of transparency.

14. The system of claim 11, wherein the control circuitry, when automatically adjusting the transparency of the map overlay to the second level of transparency, is configured to:
identify a first portion of the content item and a second portion of the map overlay, wherein the first portion and the second portion overlap;
determine a first color of the first portion; and
adjust, in the second portion, a second color to modify contrast between the map overlay and the content item based on the second level of transparency.

15. The system of claim 14, wherein the control circuitry, when the adjusting, in the second portion, the second color, is configured to:
select a plurality of pixels in the second portion of the map overlay based on the second level of transparency; and
set the second color of the plurality of pixels to the first color.

16. The system of claim 11, wherein the second level of transparency is less than the first level of transparency.

17. The system of claim 11, wherein the control circuitry is further configured to:
determine a receipt time of data corresponding to the first location; and
in response to determining that (1) the first location is the same as the second location and (2) a threshold period of time has elapsed since the receipt time, adjust the transparency of the map overlay to a fourth level of transparency that is greater than the second level of transparency, wherein the fourth level of transparency corresponds to a greater ratio between the values corresponding to the pixels of the map overlay and the values corresponding to the pixels of the content item than the ratio corresponding to the second level of transparency.

18. The system of claim 11, wherein the control circuitry is further configured to:
identify a plurality of directions in the route, wherein each direction of the plurality of directions is triggered at a respective reference location;
determine whether the current location is within a threshold distance from the respective reference location of a direction of the plurality of directions; and
in response to determining that the current location is within the threshold distance from the respective reference location, detect the directional change.

19. The system of claim 11, wherein the control circuitry is further configured to:
estimate at least one of a remaining travel time for reaching a destination of the route or an amount of traffic for reaching the destination of the route;
identify an alternate route that can be taken at a location on the route by at least one of:
determining that the alternate route reduces the remaining travel time for reaching the destination; or
determining that the alternate route reduces the amount of traffic for reaching the destination; and
in response to determining that the current location is within a threshold distance from the location, detect the directional change.

20. The system of claim 11, wherein the control circuitry is further configured to:
adjust a respective transparency value of a respective portion of the map overlay that depicts a location of interest, in response to determining that the location of interest is listed in a user profile, wherein the respective transparency value of the respective portion of the map overlay corresponds to a transparency value corresponding to the transparency of the map overlay.

\* \* \* \* \*